United States Patent
Chandran et al.

(10) Patent No.: US 10,129,309 B2
(45) Date of Patent: Nov. 13, 2018

(54) MIXING CONTENT INTO A CONTENT STREAM

(71) Applicant: Google Inc., Mountain View, CA (US)

(72) Inventors: Harish Chandran, Sunnyvale, CA (US); Lucian Florin Cionca, Santa Clara, CA (US); Amogh Sanjay Asgekar, Palo Alto, CA (US); Panchapagesan Krishnamurthy, Foster City, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/289,057

(22) Filed: Oct. 7, 2016

(65) Prior Publication Data

US 2017/0104802 A1    Apr. 13, 2017

Related U.S. Application Data (60) Provisional application No. 62/239,191, filed on Oct. 8, 2015.

(51) Int. Cl.
| | |
|---|---|
| *H04L 29/06* | (2006.01) |
| *G06Q 50/00* | (2012.01) |
| *H04L 29/08* | (2006.01) |

(52) U.S. Cl.
CPC ......... *H04L 65/4084* (2013.01); *G06Q 50/01* (2013.01); *H04L 65/605* (2013.01); *H04L 67/2838* (2013.01); *H04L 67/20* (2013.01)

(58) Field of Classification Search
CPC .... G06Q 50/01; G06Q 30/02; G06Q 30/0255; G06Q 30/0277; G06Q 30/0261;
(Continued)

(56) References Cited

U.S. PATENT DOCUMENTS

| | | |
|---|---|---|
| 8,880,499 B1 | 11/2014 | Wu |
| 2007/0162933 A1 | 7/2007 | Hays et al. |

(Continued)

FOREIGN PATENT DOCUMENTS

| | | |
|---|---|---|
| EP | 2753041 A1 | 7/2014 |
| JP | 2011-014035 A | 1/2011 |

(Continued)

OTHER PUBLICATIONS

International Search Report and Written Opinion dated Jan. 19, 2017, which issued in International Application No. PCT/US2016/056160.

Japanese Office Action from Japanese Patent Application No. 2018-501219, dated Aug. 13, 2018, 8 pages.

*Primary Examiner* — Ruolei Zong (74) *Attorney, Agent, or Firm* — McDermott Will & Emery LLP (57) ABSTRACT

Aspects of the subject technology relate to mixing an aggregated content data structure into a content stream. A first plurality of aggregated content data structures is be received, each comprising a group of content items for display in a content stream of a user and being associated with a respective score. A first aggregated content data structure may be selected from among the first plurality of aggregated content data structures based on the scores and predetermined type target percentages associated with the user. The first aggregated content data structure may be mixed into a content stream associated with a user, and the content stream provided for display.

20 Claims, 5 Drawing Sheets

(58) Field of Classification Search
CPC ... H04L 65/60; H04L 65/4084; H04L 65/601; H04L 67/20; H04L 67/22; H04L 67/2838; H04L 67/30; H04L 9/0872
USPC .......................................................... 709/219
See application file for complete search history.

(56) References Cited

U.S. PATENT DOCUMENTS

| | | | |
|---|---|---|---|
| 2012/0066186 A1* | 3/2012 | Wohlert | G06F 17/30029 707/691 |
| 2013/0097186 A1 | 4/2013 | van Hoff | |
| 2013/0173709 A1 | 7/2013 | Yerli | |
| 2013/0332523 A1 | 12/2013 | Luu | |
| 2014/0280181 A1* | 9/2014 | Rodger | G06F 17/30772 707/740 |
| 2015/0206254 A1 | 7/2015 | Loh et al. | |
| 2015/0248222 A1* | 9/2015 | Stickler | G06Q 10/06 715/763 |
| 2016/0179808 A1* | 6/2016 | De Napoli Ferreira | G06F 17/3089 707/725 |
| 2016/0350669 A1* | 12/2016 | Jurka | G06F 17/3053 |

FOREIGN PATENT DOCUMENTS

| | | |
|---|---|---|
| JP | 2014-006822 A | 1/2014 |
| WO | WO-2015/101945 A1 | 7/2015 |

\* cited by examiner

FIG. 6

MIXING CONTENT INTO A CONTENT STREAM

CROSS-REFERENCE TO RELATED APPLICATIONS

The present application claims the benefit of priority under 35 U.S.C. § 119 from U.S. Provisional Patent Application Ser. No. 62/239,191 entitled "Mixing Content into a Content Stream," filed on Oct. 8, 2015, the disclosure of which is hereby incorporated by reference in its entirety for all purposes.

BACKGROUND

The present disclosure generally relates to content delivery, and in particular, to mixing content into a content stream. Users may read, view, post, share, or otherwise consume content items from multiple sources. The amount of content items available for consumption increases, for example, as the user selects additional sources of content from which to receive content items and/or if the selected sources continue to produce content items. For instance, the user may receive live news updates from a news source as well as receive social network updates. Organizing the content items and determining what content items to consume may become more complicated as the amount of available content increases and as screen space becomes more limited, such as when the content is consumed on a mobile device.

SUMMARY

Aspects of the subject technology relate to a machine-implemented method for creating an aggregate content list. The method includes receiving a first plurality of aggregated content data structures, wherein each aggregated content data structure references a group of content items and is associated with a respective score and a respective category type of a plurality of category types, each of the group of content items being associated with the category type associated with the aggregated content data structure, selecting a first aggregated content data structure from among the first plurality of aggregated content data structures based on respective scores for the first plurality of aggregated content data structures and a predetermined type target percentage for the category type associated with the first aggregated content data structure, mixing the first aggregated content data structure into a content stream associated with the user, and providing the content stream, including the first aggregated content data structure, for display to the user.

Aspects of the subject technology also relate to a computing system for creating an aggregate content list. The system includes one or more processors and a non-transitory computer-readable medium including instructions stored therein, which when executed by the one or more processors, cause the one or more processors to perform operations. The operations include receiving a first plurality of aggregated content data structures, wherein each aggregated content data structure references a group of content items and is associated with a respective score and a respective category type of a plurality of category types, each of the group of content items being associated with the category type associated with the aggregated content data structure, selecting a first aggregated content data structure from among the first plurality of aggregated content data structures based on respective scores for the first plurality of aggregated content data structures and a predetermined type target percentage for the category type of the first aggregated content data structure, mixing the first aggregated content data structure into a content stream associated with the user, and providing the content stream, including the first aggregated content data structure, for display to the user.

Aspects of the subject technology also relate to a non-transitory machine-readable medium including instructions stored therein, which when executed by a machine, cause the machine to perform operations for creating an aggregate content list. The operations include receiving a first plurality of aggregated content data structures, wherein each aggregated content data structure references a group of content items and is associated with a respective score and a respective category type of a plurality of category types, each of the group of content items being associated with a category type associated with the aggregated content data structure, normalizing the score of each of the first plurality of data structures to be between a first predetermined value and a second predetermined value, selecting a first aggregated content data structure from among the first plurality of aggregated content data structures based on respective normalized scores for the first plurality of aggregated content data structures and a predetermined type target percentage for the category type of the first aggregated content data structure, mixing the first aggregated content data structure into a content stream associated with a user, and providing the content stream, including the first aggregated content data structure, for display to the user.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

A user may utilize a web service, such as a social network service, to find and consume content items. A content item may include any type of content, such as audio, video, graphics, text, and combinations thereof, which is available online through, for example, the Internet. Content items may include news articles, social network posts, social network event updates, media uploaded by users, comments from users, shares from users, websites, etc. that the user may consume by viewing or interacting with. The social network service may collect or receive content items from various sources, and provide content items to the user in a content stream. Sources for the content items include servers for news services, media services, photo-sharing services, and other content services such that the content items may be requested and retrieved from the servers of the respective services.

A content stream may include one or more content items. For example, the content stream may include a list of content items, which may be updated as new content items are created or retrieved. The content stream may be provided to or by a social network service and be accessible to the user via the social network service, such as on a user interface provided to the user by the social network service. For example, to access the user's content stream, the user may need to initiate a login session for the social network service by logging into an account that the user has created for the social network service. The user interface for displaying the content stream may be provided to the user upon the user logging into the user's account for the social network service. By way of non-limiting example, the social network service may be accessed through a web page, which may be loaded by a web browser application executed on a client device of the user. The social network service may be accessed through a web application or a standalone client application executed on the client device of the user.

In some implementations, the content stream may be provided to the user one page at a time, with each page including a number of content items (e.g., ten content items). For example, the first ten content items may be loaded in the user interface for the user to allow the user to examine, navigate (e.g., scroll) through, and select content items for consumption. Upon the user reaching a point in the user interface that is indicative of the user reaching an end of the first ten content items, a next set of ten content items may be selected by the social network service for inclusion on a next page of the content stream, and the next page is then loaded in the user interface.

A score may be associated with a content item based on a set of criteria. The set of criteria may include, by way of non-limiting example, dates associated with the content items (e.g., time the content item was posted online), topics associated with the content items, authors of the content items, among others. For a given content item, the score assigned to a content item for one user may be different from the score assigned to the same content item for another user based on respective user profiles, for example. The score may be utilized to select content items for the content stream of a user and to order the selected content items within the content stream of the user.

Content items from various sources may be analyzed and grouped together into aggregated content data structures. Aggregated content data structures may be data structures, such as a list, an ordered list, a graph, or a grouping of a finite number of content items. Content items may be organized into aggregated content data structures based on, for example, a common theme or relevance, such as relevance to a specific topic, relevance to a location, or association with certain users. The aggregated content data structure may be named based on the common theme or relevance. The user may be interested in content items having certain characteristics and/or associated with particular topics. For example, the user may be interested in content items from people having a specific relationship to the user, such as family members. The user may be interested in content items related to a location associated with the user. For instance, if the content item is geotagged or contains location information, the content item may be aggregated as part of an aggregated content data structure whose content items are associated with the location information.

According to various aspects of the subject technology, aggregated content data structures may be mixed into a user's content stream. The aggregated content data structures may be presented to the user as part of the user's content stream such that the user may select content items from the aggregated content data structure for consumption. Each aggregated content data structure is associated with a score that is based on scores of the content items in the aggregated content data structure. In some implementations, the aggregated content data structures are selected and ordered within the user's content stream based on the scores of the aggregated content data structures. For example, the aggregated content data structures associated with higher scores than other aggregated content data structures may be selected for mixing into the user's content stream (e.g., adding the aggregated content data structures to an existing content stream or generating the content stream using the aggregated content data structures and other content items). The aggregated content data structures associated with higher scores are generally more likely to be of interest to the user relative to aggregated content data structures associated with lower scores.

Mixing the aggregated content data structures into the user's content stream may allow the user to consume content items from various sources that pertain to a common theme or relevance. Such mixing may allow the user to consume the content items of the various sources of content without needing to individually visit the various sources of content. Individually visiting the various sources may be cumbersome to the user for example. Furthermore, the content items that pertain to the common theme or relevance may be difficult for the user to locate even when the user visits the sources themselves directly rather than via the content stream. Such mixing may also allow for an introduction of content items related to the common theme or relevance from sources that the user may not be aware of.

Figure 1:
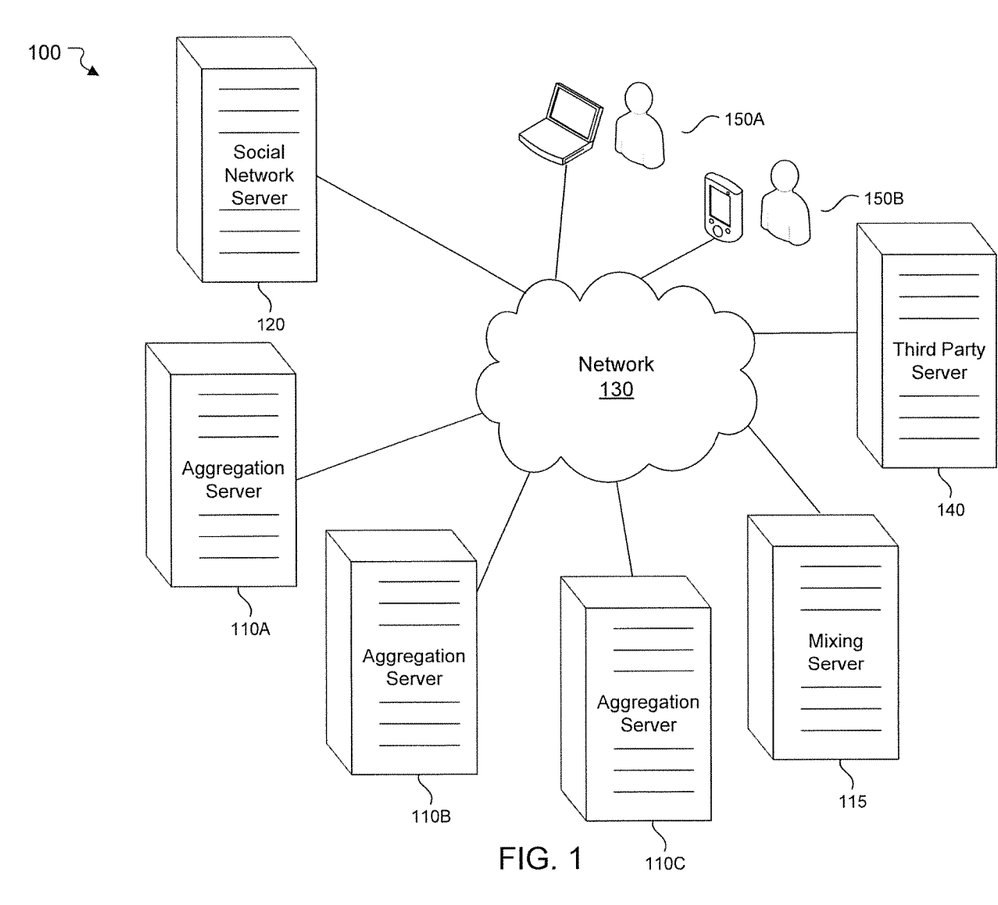
FIG. 1 illustrates an example network environment within which some implementations of the subject technology can be implemented.

FIG. 1 illustrates an example network environment 100 within which some implementations of the subject technology can be implemented. The network environment 100 includes an aggregation server 110A, an aggregation server 110B, an aggregation server 110C, a mixing server 115, a social network server 120, a network 130, a third party server 140, a client device 150A, and a client device 150B. In some aspects, network environment 100 can be a distributed client/server system that spans one or more networks such as the network 130. The network 130 can be a large computer network, including a local area network (LAN), wide area network (WAN), the Internet, a cellular network, or a combination thereof connecting any number of mobile clients, fixed clients, and servers. In some aspects, each client (e.g., client devices 150A and/or 150B) can communicate with servers (e.g., one or more of the aggregation servers 110A, 110B, and 110C, the mixing server 115, the social network server 120, and the third party server 140) via a virtual private network (VPN), Secure Shell (SSH) tunnel, or other secure network connection. In some aspects, the network 130 may further include a corporate network (e.g., intranet) and one or more wireless access points.

The aggregation servers 110A, 110B, and 110C (referred to hereafter as 110A-C), mixing server 115, social network server 120, and third party server 140 are each a computing device, such as a computer server. In some implementations, the aggregation servers 110A-C, mixing server 115, social network server 120, and/or third party server 140 may each represent more than one computing device working together to perform the actions of a server (e.g., a server farm). Alternatively, one or more of the aggregation servers 110A-C, mixing server 115, social network server 120, and/or third party server 140 may be implemented in a common system. For example, a common system may include the aggregation servers 110A and 110C and the mixing server 115.

The client devices 150A and 150B represent various forms of computing devices and may be any system or device having a processor, a memory, and network communications capability. Examples of computing devices include a desktop computer, a laptop computer, a handheld computer, a tablet computer, a television coupled to a processor or having a processor embedded therein, a personal digital assistant (PDA), a network appliance, a camera, a smart phone, a media player, a navigation device, an email device, a game console, or a combination of any of these computing devices or other computing devices. Although FIG. 1 shows only the client devices 150A and 150B, more or fewer client devices may be communicatively connected to the network 130.

In some aspects, the client devices 150A and/or 150B may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

The aggregation servers 110A-C, the mixing server 115, the social network server 120, the third party server 140, and the client devices 150A and 150B are communicatively coupled through the network 130. In some implementations, the client devices 150A and 150B send content to and receive content from the social network server 120. The social network server 120 may be a web server for the social network service. The user may use the client devices 150A and/or 150B to access the social network service from the social network server 120. The client devices 150A and/or 150B may also be used to post content items to the social network server 120.

The third party server 140 may be a server for another web service, such as a news service or media service. The client devices 150A and 150B may view content items from the third party server 140 or post content items to the third party server 140. The social network server 120 may access content items from the third party server 140. In some implementations, the third party server 140 may be a source of content items for one or more of the aggregation servers 110A-C and/or the social network server 120.

The social network server 120 may act as a repository for content items for the aggregation servers 110A-C to analyze. Each content item is associated with one or more entities derived from content and/or source of the content item. An entity may be a person, such as a specific person (e.g., President Washington) or a general type of person (e.g., president). An entity may be a place, such as a specific location (e.g., Washington D.C.) or a general location (e.g., capital). An entity may be an object, such as a specific object (e.g., Washington Monument), general object (e.g., building), or idea (e.g., legacy).

The associations between the entities and the content item are based on the content of the content item. The entities associated with a content item may be determined based on an analysis of the content item. The analysis may include looking for labels (e.g., tags) that have been assigned to the content item, such as by an author and/or a publisher of the content item. The analysis may also include identifying keywords and/or key phrases in the content item that are associated with one or more entities, where the associations may be provided in a database that maps entities to keywords and/or key phrases. For example, a content item may be a web page about Redwood National Park. Entities associated with the content item may include, for example, "Redwood National Park," "national parks," "forests," and "trees."

The entities and relationships between entities may be stored in a knowledge graph on the social network server 120 or another server. For example, the knowledge graph may be represented by a graph having a node for each entity, and links between the nodes based on relationships between the entities. The entities in the knowledge graph may be based on content items available from a period of time, such as the past year. The relationships may be based on co-occurrences of the entities in the content items.

Information associated with the user may be available in a user model, which may be stored on the social network server 120 or on another server. In situations in which the systems discussed herein collect personal information about users, or may make use of personal information, the users are provided with an opportunity to control whether programs or features collect user information (e.g., information about a user's social network, a user's browsing data, a user's social actions or activities, a user's profession, a user's preferences, or a user's current location), or to control whether and/or how to receive content from a content server that may be more relevant to the user. In addition, certain data may be treated in one or more ways before the data is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user has control over how information is collected about the user and used by a content server.

In instances where the user consents to the use of the user's data in the social network service, the user model may be based on, for instance, a user profile in a social network service, relationships in the social network, a social graph from the social network, contacts, and user settings or preferences. In instances where the user consents to the use of the user's browsing data, the user's browsing data may be aggregated with browsing data from other users who have also consented to the use of browsing data. The aggregated user browsing data may be used to build the user model. The user model may provide an indication of the user's affinities to various entities in the knowledge graph, as well as affinities to other users.

The social network server 120 may request content items from the third party server 140. The social network server 120 may also store data including, for example, aggregated browsing data, user models, knowledge graphs, etc. The aggregation servers 110A-C may analyze content items and group content items into aggregated content data structures. In some aspects, the aggregated content data structures may be provided to the client devices 150A and/or 150B either directly, or indirectly, such as through the social network server 120. Alternatively or in addition, the aggregated content data structures may be provided to the mixing server 115. The mixing server 115 may receive aggregated content data structures from each of the aggregation servers 110A-C and mix the aggregated content data structures into a user's content stream.

In some implementations, the social network server 120 may tag attributes to the content items to be used by the aggregation servers 110A-C. Alternatively or in addition, the attributes of the content items may be tagged by the aggregation servers 110A-C, the third party server 140, a source or originator (e.g., author, publisher) of the content item, and/or other web services (e.g., cloud-based services). By way of non-limiting example, an attribute associated with a content item may include an entity associated with the content item, a topic associated with the content item, a location associated with the content item with respect to a user location, a size or length of the content item, media associated with the content item, an age associated with content item, an original source of the content item, an author and/or a publisher of the content item, a relationship between a user and an author of the content item, a popularity of the content item, a percent of content corresponding to the attribute, etc. For example, the popularity of a content item (e.g., a web page) may be based on a number of times the content item has been consumed (e.g., visited) by users.

In some implementations, one or more of the aggregation servers 110A-C and the mixing server 115 may be part of the same server system. In some implementations, the social network server 120 may store the content items. In some implementations, one or more of the aggregation servers 110A-C and the social network server 120 may be part of the same server system. In some implementations, the third party server 140 and the social network server 120 may be part of the same server system.

Figure 2:
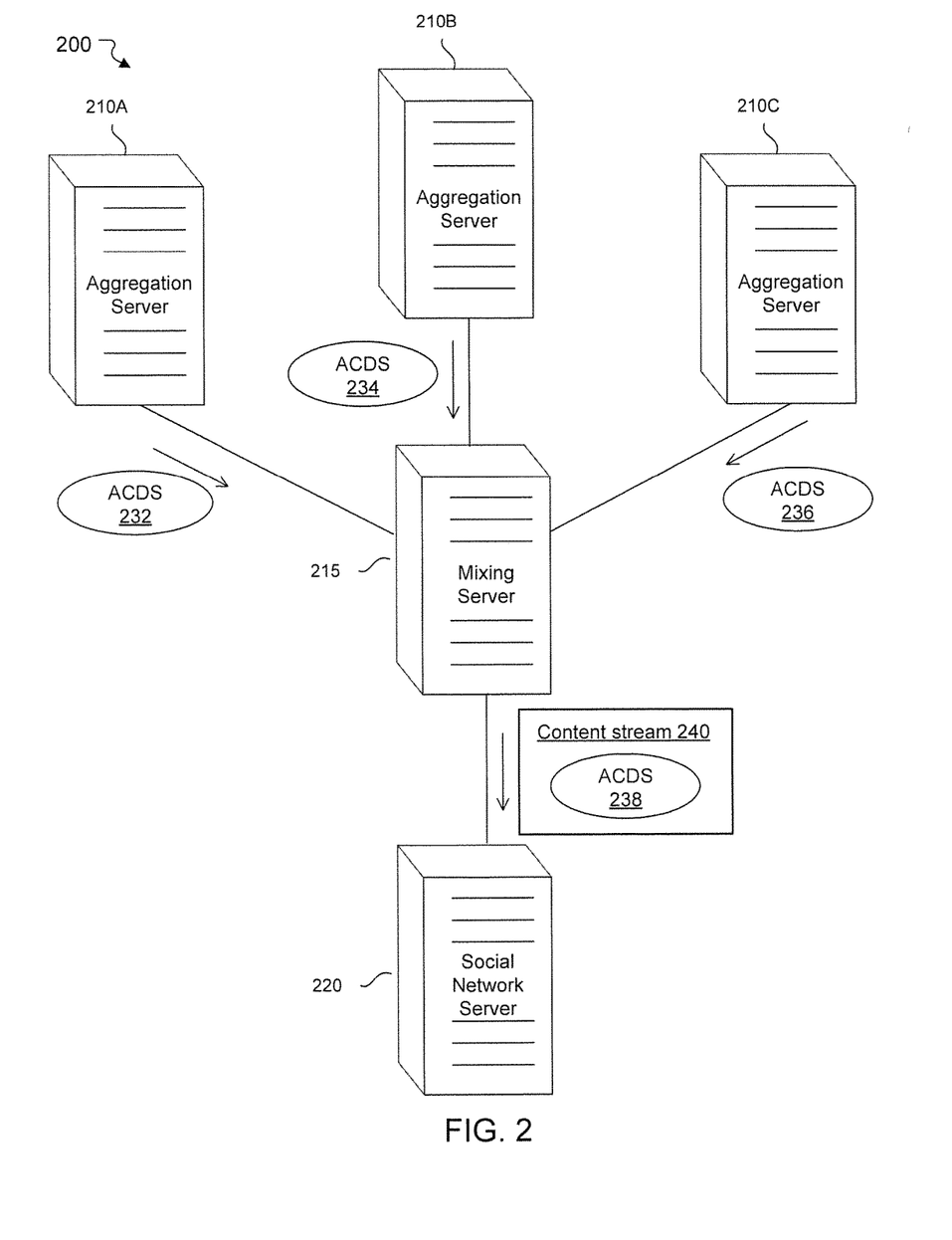
FIG. 2 illustrates an environment for facilitating mixing of aggregated content data structures into a content stream, according to example aspects of the subject technology.

FIG. 2 illustrates an environment 200 for facilitating mixing of aggregated content data structures into a content stream, according to example aspects of the subject technology. The environment 200 includes aggregation servers 210A, 210B, and 210C (hereafter referred to as 210A-C), mixing server 215, and social network server 220. In some implementations, the aggregation servers 210A-C, mixing server 215, and/or social network server 220 may be the aggregation servers 110A-C, mixing server 115, and/or social network server 120, respectively, shown in FIG. 1. Each aggregated content data structure received by the mixing server 215 is associated with a respective source server, which may be one of the aggregation servers 210A-C or other aggregation servers not shown in FIG. 2.

Although FIG. 2 shows the aggregation servers 210A-C, more or fewer aggregation servers 210A-C may be communicatively connected to the mixing server 215. The aggregation servers 210A-C may be communicatively connected to the mixing server 215 via a network (e.g., the network 130). The mixing server 215 may be communicatively connected to the social network server 220 via a network (e.g., the network 130).

Figure 3:
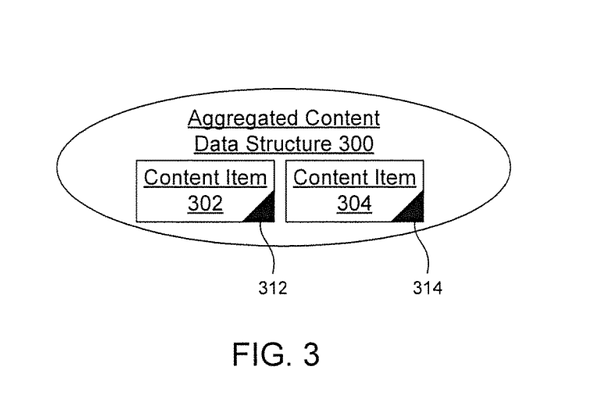
FIG. 3 illustrates an example of an aggregated content data structure, according to example aspects of the subject technology.

FIG. 3 illustrates an example of an aggregated content data structure 300 according to example aspects of the subject technology. The aggregated content data structure 300 includes content item 302 and content item 304. For explanatory purposes, the aggregated content data structure 300 is created by the aggregation server 210A. For example, the aggregated content data structure 300 may be the aggregated content data structure 232 shown in FIG. 2. However, other aggregation servers (e.g., 210B, 210C) may create the aggregated content data structure 300. The aggregated content data structure 300 may include additional content items not shown in FIG. 3.

In some implementations, the aggregation server 210A may receive content items from the social network server 220. The content items may include tags. For example, the social network server 220 may be configured to tag content items for certain attributes. In FIG. 3, the content item 302 is tagged with a tag 312 and the content item 304 is tagged with a tag 314. The tags 312 and 314 may allow the aggregation server 210A to request and/or aggregate content items based on the certain attributes. The attributes of a content item may be based on one or more of the entities of the content item, relevance of the content item to a particular topic, location associated with the content item, size or length of the content item, media associated with the content item, age of the content item, original source of the content item, author of the content item, percent of content corresponding to the attribute, etc.

The aggregation server 210A may create the aggregated content data structure 300 by aggregating content items into the aggregated content data structure 300 based on a set of criteria. The aggregation servers 210B and 210C may create their respective aggregated content data structures based on different respective sets of criteria. For example, the aggregation server 210A may aggregate content items that share a common topic (e.g., the content items deal with sports) into one aggregated content data structure, the aggregation server 210B may aggregate content items that share a common location (e.g., the content items relate to local news), and the aggregation server 210C may aggregate content items related to top (e.g., most recent) news stories around the world. In some cases, a criterion may include a presence or absence of a certain attribute or a certain tag. Although one or multiple criteria utilized by the aggregation servers 210A-C may overlap, relative weight associated with each criterion may differ between the aggregation servers 210A-C.

Any of the aggregation servers 210A-C may create different sets of aggregated content data structures based on a category type. For example, the aggregation server 210A may create a set of aggregated content data structures that share a common topic (e.g., the content items deal with sports) and a set of aggregated content data structures that share a common location (e.g., the content items deal with local news).

With reference to FIG. 2, the aggregation servers 210A-C may determine a score for each content item in each aggregated content data structure and may determine a score for each aggregated content data structure based on the respective scores of the content items in the aggregated content data structure. Each of the aggregation servers 210A-C may utilize different criteria and/or equations for determining a score for a content item and/or an aggregated content data structure. The aggregation servers 210A-C may provide the scores of the aggregated content data structures to the mixing server 215. The aggregation servers 210A-C may also provide the scores of the content items to the mixing server 215.

The score for a content item may be based on the attributes associated with the content item (e.g., the entities included in the content item, relevance of the content item to a particular topic, age of the content item, etc.). The score for the content item may also be based on an affinity of a user to these attributes, where the affinity of the user to the attributes may be based on information about the user that is available in the user model. The score for the aggregated content data structure may be based on the scores of a top k content items in the aggregated content data structure. For example, the score for the aggregated content data structure may be based on an average of the scores of the five content items with the highest scores. Accordingly, the respective score of an aggregated content data structure may be determined based on an affinity of the user to one or more attributes associated with the group of content items of the aggregated content data structure.

Figure 4:
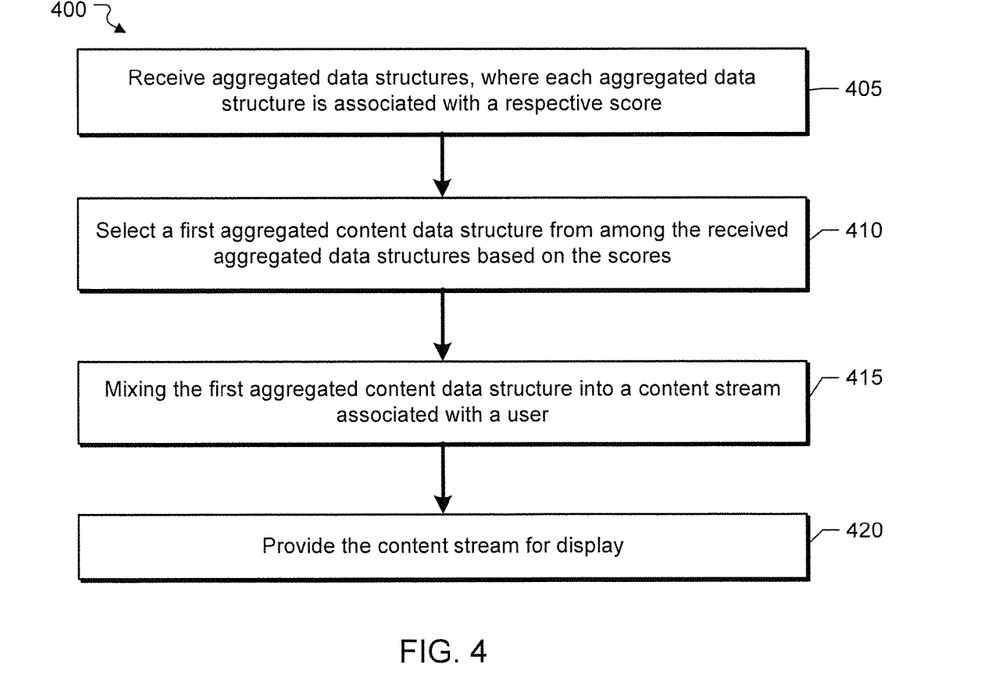
FIG. 4 illustrates a flowchart of a process for mixing an aggregated content data structure into a content stream, according to example aspects of the subject technology.

FIG. 4 illustrates a flowchart 400 of a process for mixing an aggregated content data structure 238 into a content stream 240, according to example aspects of the subject technology. The content stream 240 may be a content stream provided for a user's account on a social network service that is accessible to the user through the social network service. The flowchart 400 is described with respect to FIG. 2.

At block 405, the mixing server 215 receives aggregated content data structures from the aggregation servers 210A-C. Each aggregated content data structure references a group of content items to be displayed (e.g., as a discrete bundle of content items) in content stream 240. The aggregation server 210A provides an aggregated content data structure 232 to the mixing server 215, the aggregation server 210B provides an aggregated content data structure 234 to the mixing server 215, and the aggregation server 210C provides an aggregated content data structure 236 to the mixing server 215. The aggregated content data structures 232, 234, and 236 are denoted as ACDS in FIG. 2. Each aggregated content data structure 232, 234, and 236 is associated with a score provided by its respective aggregation server.

In some implementations, each of the aggregation servers 210A-C creates multiple aggregated content data structures, selects from among these aggregated content data structures the aggregated content data structure associated with the highest score, and provides the selected aggregated content data structure to the mixing server 215. The remaining aggregated content data structures may remain queued in the aggregation servers 210A-C until a next aggregated content data structure needs to be sent to the mixing server 215.

In some implementations, the mixing server 215 may send a request for the aggregation servers 210A-C to create or otherwise have ready a number of aggregated content data structures to be provided to the mixing server 215. For example, the mixing server 215 may request that each of the aggregation servers 210A-C create ten aggregated content data structures and send one aggregated content data structure from among these ten aggregated content data structures. The aggregation servers 210A-C having multiple aggregated content data structures ready for the mixing server 215 may help reduce latency associated with the mixing server 215 waiting for an aggregated content data structure to be created by and received from one or more of the aggregation servers 210A-C.

In some implementations, the mixing server 215 may send a request for the aggregation servers 210A-C to create or otherwise have ready a number of aggregated content data structures associated with certain category types to be provided to the mixing server 215. Each of the aggregated content data structures may be associated with a category type. In this regard, each of the content items within and/or referenced by an aggregated data structure is associated with the category type of the aggregated content data structure. For example a category type may be a common theme or relevance associated with the content items. For explanatory purposes, an aggregated content data structure in FIGS. 2-4 may be one of three types. A first type of aggregated content data structure contains content items that deal with sports. A second type of aggregated content data structure contains content items that relate to local news. A third type of aggregated content data structure contains content items related to the most recent news stories around the world. Thus, the aggregation server 210A creates aggregated content data structures of the first type and the second type, the aggregation server 210B creates aggregated content data structures of the second type, and the aggregation server 210C creates aggregated content data structures of the third type.

Each category type is associated with a respective type selection percentage. For a given category type, the type selection percentage is a percentage of the total number of aggregated content data structures associated with the given category type have been selected by the mixing server 215 over the total number of aggregated content data structures of all the category types that have been selected by the mixing server 215 from the available aggregation servers (e.g., the aggregation servers 210A-C in FIG. 2). In other words, the type selection percentages for the category types available from aggregation servers 210A-C are determined based on prior selections of respective aggregated data structures for mixing within the content stream of the user. For example, if the mixing server 215 has selected two aggregated content data structures of the first type from the aggregation server 210A, two aggregated content data structure of the second type from the aggregation server 210B, and no aggregated data structures of the third type, the type selection percentage for the first type, second type, and third type are 50% (i.e., 2 out of 4), 50% (i.e., 2 out of 4), and 0% (i.e., 0 out of 4), respectively.

Each of the three types of aggregated content data structures is associated with a respective predetermined type target percentage. For example, the predetermined type target percentage for the first type, second type, and third type of aggregated content data structure may be 40%, 40%, and 20%, respectively. The predetermined type target percentages may be set by the user or adaptively set based on the user model.

If information about the user that is available to the social network service is scarce, the predetermined type target percentages may be set such that the aggregated content data structures associated less with user-specific attributes may have a higher predetermined type target percentage. For example, the third type of aggregated content data structure, which contains content items related to top news stories around the world, may be set to a higher predetermined type target percentage since such content items are associated less with user-specific attributes. On the other hand, the first type of aggregated content data structure, which contains content items related to sports content, may be set to a lower predetermined type target percentage if information pertaining to affinity between the user and sports related content items is unavailable. The mixing system 215 may adjust the predetermined type target percentages as more information about the user becomes available to the social network service. In this regard, the predetermined type target percentages for a user may be based on prior interactions of the user with content items (e.g., provided by other users) in the social network. For example, if the user consistently selects content items (e.g., individually or from aggregated content data structures) of a particular category type, the predetermined type target percentage may be adjusted to increase the predetermined type target percentage associated with the particular category type.

At block 410, the mixing server 215 selects one of the received aggregated content data structures based on the scores of received aggregated content data structures. In some implementations, the mixing server 215 selects the aggregated content data structure associated with the highest score. The type selection percentages for each of the types of aggregated content data structures may be updated subsequent to the selection of the received aggregated content data structures.

In some implementations, the aggregation servers 210A-C utilize different scoring methodologies and/or different score values from one another. In such implementations, the mixing server 215 normalizes the aggregated content data structure scores that are provided by the aggregation servers 210A-C. For example, the mixing server 215 may normalize the scores such that the score of each of the received aggregated content data structures is between a first predetermined value (e.g., 0) and a second predetermined value (e.g., 1). In some implementations, the mixing server 215 selects the aggregated content data structure associated with the highest normalized score.

In some implementations, to normalize the scores for the aggregated content data structures, the mixing system 215 may divide the score of each content item of each respective aggregated content data structure by the score of the content item in the respective content list with the highest score. In such implementations, the content item with the highest score is 1 for each of the aggregated content data structures. The mixing system 210 may then compute a score for the aggregated content data structures based on the scores of some or all of the content items in each aggregated content data structure. For example, the mixing system 215 may compute a score of an aggregated content data structure by taking an average of the five content items associated with the highest scores.

In the case of a tie between two or more aggregated content data structures, such as when these aggregated content data structures have the same normalized score, the mixing server 215 may have predetermined rules for breaking the tie. For example, the mixing server 215 may have a predetermined rule to select the aggregated content data structure of the type associated with the highest predetermined type target percentage and/or the aggregated content data structure that arrived first at the mixing server 215. As another example, the mixing server 215 may have a predetermined rule to randomly select from among the tied aggregated content data structures.

At block 415, the mixing server 215 mixes the selected aggregated content data structure 238 into the content stream 240 of the user. In this regard, the aggregated content data structure 238 may be added to an existing content stream or added to a group of existing content items selected for the content stream. The aggregated content data structure 238 is mixed to be placed among or between other content items in the stream when the stream is displayed (e.g., not in sequence with other aggregated content data structures). The selected aggregated content data structure 238 is one of the aggregated content data structures 232, 234, or 236. At block 420, the mixing server 215 provides to the social network server 220 the content stream 240 with the selected aggregated content data structure mixed in. The user may access the content stream 240 through a user interface provided to the user by the social network server 220. Accordingly, the user may view the aggregated content data structure 238 as a bundled group of content items among other individual content items within the content stream 240.

In some implementations, the mixing server 215 preserves the order of the content items in the aggregated content data structures from the aggregation servers 210A-C. For example, the aggregation servers 210A-C may provide the aggregated content data structure as an ordered list of content items based on the scores of the content items. In a case where the aggregated content data structures from the aggregation servers 210A-C do not contain the content items in order based on their respective scores, the mixing server 215 may order the content items within the selected aggregated content data structure based on the respective scores.

The type selection percentage may be applied across a particular time and/or across a number of content items in the content stream 240. To reset the type selection percentages, the total number of aggregated content data structures that has been selected by the mixing server 215 for each type of aggregated content data structure is set to zero and the total number of aggregated content data structures that has been selected by the mixing server 215 of all types of aggregated content data structures is set to 0. Thus, upon reset, the type selection percentage for each of the different types of aggregated content data structures is set to 0%.

A reset of the type selection percentages may be performed at certain times or based on a number of content items in the content stream 240. In some implementations, the type selection percentage for each of the different types of aggregated content data structures may be reset when the user initiates a new login session for the social network service. The user may need to initiate a new login session when a previous login session has expired (e.g., user manually logged out of login session, login session timed out due to user inactivity, etc.). In some implementations, the type selection percentage for each of the different types of aggregated content data structures may be reset on a page-by-page basis for each page of the content stream 240. For example, the type selection percentage for each of the different types of aggregated content data structures may be reset when the user navigates from a first page (e.g., a current page) of the content stream 240 to a second page (e.g., a next page) of the content stream 240.

Within a user login session for the social network service, the user's navigation to the new page of the content stream 240 may prompt the mixing server 215 to select additional aggregated content data structures for mixing into the content stream 240. Within the user login session, the user's navigation to a previous page of the content stream 240 that has previously been populated with content items and aggregated content data structures may cause a reloading of the previous page with the same content items and aggregated content data structures.

Allowing previously populated pages of the content stream 240 to remain populated with the same content items may allow the user to more easily locate content items that were previously presented to the user. In some cases, the previously populated page of the content stream 240 may be updated as new content items are created or retrieved to include these new content items, which may cause movement of content items of the previously populated page to another page. In some cases, each page of the content stream 240 may allow for ten content items to be provided to the user, of which each aggregated content data structure mixed into the content stream 240 may be considered one of the ten content items. In some implementations, once the login session has expired, the content stream 240 and the aggregated content data structures may need to be constructed, e.g., by the social network service and the mixing server 215, respectively. Construction of the content stream 240 and the aggregated content data structures may yield a content stream and/or aggregated content data structures that are different from those constructed in the user's previous login sessions.

In some implementations, the mixing server 215 mixes aggregated content data structures into the content stream 240 such that a certain percentage of content items in the content stream 240 are aggregated content data structures. For example, the mixing server 215 may mix aggregated content data structures into the content stream 240 such that 10% of all content items in the content stream 240 are aggregated content data structures. The percentage may be set for each page, such that 10% of the content items for each page of the content stream 240 are aggregated content data structures. Of the aggregated content data structures that are mixed into the content stream 240, the mixing server 215 mixes aggregated content data structures of the different types based on the respective predetermined type target percentage for each type of aggregated content data structure.

Figure 5:
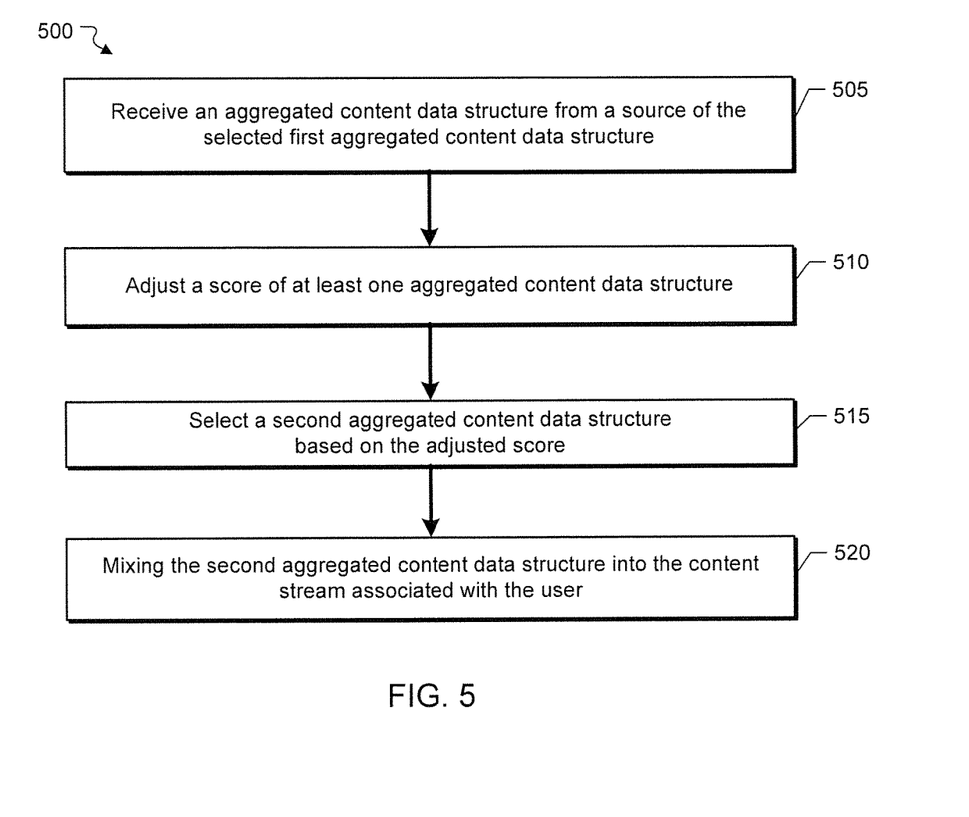
FIG. 5 illustrates a flowchart of a process for mixing an aggregated content data structure into a content stream, according to example aspects of the subject technology.

FIG. 5 illustrates a flowchart 500 of a process for mixing an aggregated content data structure into the content stream 240, according to example aspects of the subject technology. The content stream 240 may be a content stream of a user that is accessible to the user through a social network service. The flowchart 500 is described with respect to FIG. 2 and FIG. 4.

At block 505, the mixing server 215 receives an aggregated content data structure from a source (e.g., one of aggregation servers 210A-C) that provided the selected aggregated content data structure 238. The received aggregated content data structure may be provided from the queue of the aggregation server that provided the selected aggregated content data structure 238. For example, if the selected aggregated content data structure 238 is the aggregated content data structure 232 from the aggregation server 210A, the aggregated content data structure 232 may be the highest scoring aggregated content data structure created by the aggregation server 210A whereas the aggregated content data structure received by the mixing server 215 at block 505 may be the second highest scoring aggregated content data structure created by the aggregation server 210A.

At block 510, the mixing server 215 adjusts the score of at least one aggregated content data structure that has been received by the mixing server 215. The aggregated content data structures that have been received by the mixing server 215 include the aggregated content data structure received at block 505 as well as the remaining (e.g., non-selected) aggregated content data structures received at block 405.

In some implementations, the mixing server 215 adjusts the scores of one or more of the aggregated content data structures that have been received by the mixing server 215 based on the type selection percentages and the predetermined type target percentages. For an aggregation content data structure type that is exceeding its predetermined type target percentage, the score of the aggregated content data structure(s) of this type may be reduced to facilitate achieving its predetermined type target percentage. Alternatively or in addition, for an aggregation content data structure type that is not reaching its respective target percentage, the score of the aggregated content data structure(s) of this type may be boosted to facilitate achieving its predetermined type target percentage.

In some implementations, the score of an aggregated content data structure may be adjusted by applying a scale factor to the score. The scale factor may be computed using, for example, a polynomial function $f(x)=1+3x+5x^2$, where x is a difference between the current type selection percentage and the predetermined type target percentage. As one example, if the predetermined type target percentage of the first type of aggregated content data structure is 80% and the current type selection percentage of the first type is 71%, $x=0.09$ and $f(x)=1.31$. By multiplying the scale factor to the score of any aggregated content data structure of the first type that are received by the mixing server 215, the score of the aggregated content data structure(s) of the first type is boosted by 31%. The adjusted score for an aggregated content data structure of the first type may then be compared with the adjusted score of other aggregated content data structures of the first type, if any, and the score of aggregated content data structure(s) of other types. Boosting the score of the aggregated content data structure(s) of the first type increases the likelihood that an aggregated content data structure of the first type will be selected (relative to without the boosted score), and thus increases the likelihood that the predetermined type target percentage will be achieved. Such boosting may be referred to as promoting the aggregated content data structure of the first type.

As another example, if the predetermined type target percentage of aggregated content data structures of the first type is 80% and the current type selection percentage of aggregated content data structures of the first type is 89%, $x=-0.09$ and $f(x)=77\%$. By multiplying the scale factor to the score of any aggregated content data structure of the first type, the score of the aggregated content data structure(s) of the first type is reduced by 23%. The adjusted score for an aggregated content data structure of the first type may then be compared with the adjusted score of other aggregated content data structures of the first type, if any, and the score of aggregated content data structures of other types. Reducing the score of the aggregated content data structure(s) of the first type decreases the likelihood that an aggregated content data structure of the first type will be selected (relative to without the reduced score), and thus increases the likelihood that the predetermined type target percentage will be achieved. Such reduction may be referred to as demoting the aggregated content data structure of the first type.

In some implementations, the scale factor is applied on top of any scale factors that have previously been computed and applied for the aggregated content data structure of the first type. These multiple applications of the scale factors may allow continuous boosting or reduction of the scores of the aggregated content data structures of the first type as needed to facilitate achieving the predetermined type target percentages for the different types of aggregated content data structures. In some implementations, the scale factor or factors that are applied to the aggregated content data structures may be reset on a page-by-page basis for each page of the content stream 240.

The polynomial function provided above for computing the scale factor is provided by way of non-limiting example, and other linear or non-linear functions may be utilized for computing the scale factor. Although the scores may be adjusted by multiplying a scaling factor to the scores, other ways by which to adjust the scores may be utilized.

In the examples above, the score of the aggregated content data structure(s) of the first type is adjusted. Alternatively or in addition, the score of the aggregated content data structure of the other types may be adjusted. In some implementations, the adjusted score may be computed only for the aggregated content data structure types with a current type selection percentage that exceeds its predetermined type target percentage. In other implementations, the adjusted score may be computed only for the aggregated content data structure types with a current type selection percentage that does not exceed its predetermined type target percentage. In still other implementations, the adjusted score may be computed for some or all of the aggregated content data structure types with a current type selection percentage that exceeds its predetermined type target percentage and/or some or all of the aggregated content data structure types with a current type selection percentage that does not exceed its predetermined type target percentage.

At block 515, the mixing server 215 selects a second aggregated content data structure based on the scores associated with each of the aggregated content data structures. Some of these scores may have been adjusted at block 510. In some implementations, the second aggregated content data structure is associated with a score that is highest among the scores of the other aggregated content data structures. The type selection percentages for each of the aggregated content data structure types may be updated subsequent to the selection of the second aggregated content data structure.

At block 520, the mixing server 215 mixes the selected second aggregated content data structure into the content stream 240 of the user. The mixing server 215 may provide to the social network server 220 the content stream 240 with the selected aggregated content data structure mixed in.

Although the foregoing describes a case in which three types of aggregated content data structures are constructed, fewer, more, and/or different types of aggregated content data structures may be utilized. Furthermore, although the foregoing describes a case in which three aggregation servers 210A-C are utilized, fewer or more aggregation servers may be utilized. The number of types of aggregated content data structures may be the same or may be different from the number of aggregation servers.

In some implementations, a set of rules may be utilized to facilitate mixing of the aggregated content data structures into the content stream 240. The set of rules may help allow the user to be provided with aggregated content data structures from different aggregation servers and help avoid having a few aggregation servers inundating (e.g., inadvertently or advertently) the user's content stream 240. For example, a rule may be set such that, independent of the score (e.g., normalized score, adjusted score) and type of the aggregated content data structures, the mixing server 215 may not mix, into the content stream 240, more than a predetermined number (e.g., seven) of aggregated content data structures in a row from the same aggregation server.

As another example, a rule may be set to space out aggregated content data structures from the same aggregation server such that no two consecutive aggregated content data structures may be from the same aggregation server and/or no two consecutive aggregated content data structures may be of the same type. In some cases, the rule may be implemented after the aggregated content data structures have been selected. For example, the mixing server 215 may select, in order, two consecutive aggregated content data structures (e.g., a first and a second aggregated content data structure) from the aggregation server 210A followed by an aggregated content data structure from the aggregation server 210C. However, when mixing these selected aggregated content data structures into the content stream 240, the mixing server 215 may mix, in order, the first aggregated content data structure from the aggregation server 210A, the aggregated content data structure from the aggregation server 210C, and the second aggregated content data structure from the aggregation server 210A into the content stream 240.

In some implementations, the mixing server 215 may stop mixing in aggregated content data structures from a particular aggregation server. For example, the mixing server 215 may monitor activity of the aggregation servers 210A-C and may determine that the aggregation server 210B is improperly scoring its aggregation data content structures so as to cause the mixing server 215 to always select one of its aggregation data content structures prior to selecting aggregation data content structures from the other aggregation servers 210A and 210C.

In some implementations, the user may manually change the predetermined type target percentage. For example, a volume control may be provided on the user interface to the user to allow the user to set the predetermined type target percentages. The user may be provided with opportunities to provide feedback. For example, the user may indicate whether the user would like to see more, see less, never see, or always see, among other options, content items similar to a content item provided in an aggregated content data structure. The user feedback may also be provided for the aggregated content data structure as a whole, such as to see more, see less, never see, or always see, among other options, aggregated content data structures from a particular aggregation server.

Figure 6:
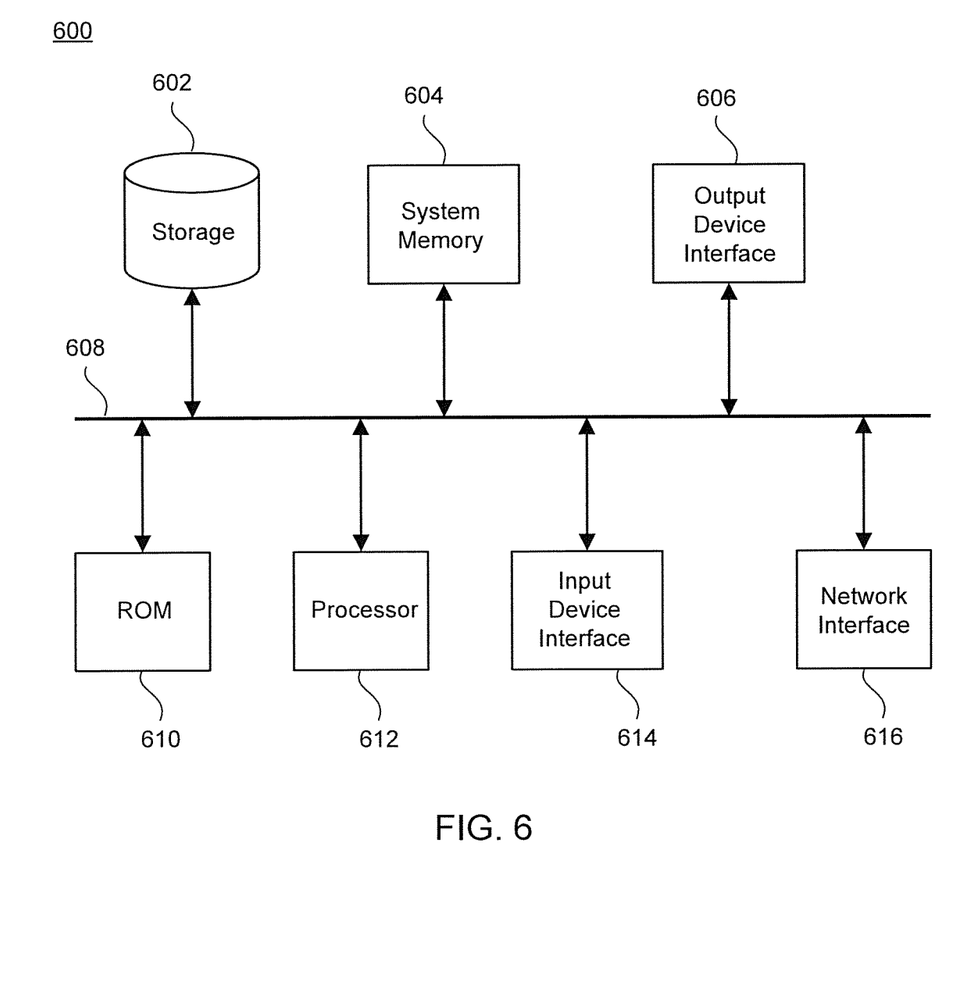
FIG. 6 conceptually illustrates an example electronic system with which some implementations of the subject technology can be implemented.

FIG. 6 conceptually illustrates an example electronic system 600 with which some implementations of the subject technology can be implemented. Electronic system 600 can be a computer, phone, PDA, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (for example, a magnetic or optical disk and its corresponding disk drive) as permanent storage device 602.

Other implementations use a removable storage device (for example, a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such as a random access memory. System memory 604 stores some of the instructions and data that the processor needs at runtime. In some implementations, the processes of the subject disclosure are stored in system memory 604, permanent storage device 602, or ROM 610. For example, the various memory units include instructions for receiving aggregated content data structures, selecting from among the aggregated content data structures, and mixing the selected aggregated content data structure into a content stream. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, for example, cathode ray tubes (CRT) or liquid crystal displays (LCD). Some implementations include devices, for example, a touchscreen that functions as both input and output devices.

Finally, as shown in FIG. 6, bus 608 also couples electronic system 600 to a network (not shown) through a network interface 616. In this manner, the computer can be a part of a network of computers (for example, a LAN, a WAN, or an Intranet, or a network of networks, for example, the Internet). Any or all components of electronic system 600 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A machine-implemented method, comprising:
    receiving, by one or more first servers from one or more different second servers, a first plurality of aggregated content data structures, wherein each aggregated content data structure comprises a listing of content items and is associated with a respective score and a respective category type of a plurality of category types, each of the content items being associated with the category type associated with the aggregated content data structure;
    selecting, by at least one of the first servers, a first aggregated content data structure from among the first plurality of aggregated content data structures based on respective scores for the first plurality of aggregated content data structures and a predetermined type target percentage for the category type associated with the first aggregated content data structure;
    mixing, by at least one of the first servers, the first aggregated content data structure into a content stream associated with a user; and
    providing, by the one or more first servers, the content stream, including the first aggregated content data structure, for display to the user at a computing device remote from the one or more first servers and the one or more second servers, wherein the servers may tag one or more attributes to the content items, and wherein the predetermined type target percentage is set such that aggregated content data structures less associated with attributes may have a higher predetermined type target percentage than aggregated content data structures more associated with attributes.

2. The method of claim 1, further comprising:

receiving an additional aggregated content data structure from a source of the selected first aggregated content data structure, wherein the additional aggregated content data structure is associated with a score;

creating a second plurality of aggregated content data structures based on removing the selected first aggregated content data structure from the first plurality of aggregated content data structures and adding the received additional aggregated content data structure;

adjusting the score associated with at least one of the second plurality of aggregated content data structures based on the selected first aggregated content data structure and a plurality of predetermined type target percentages associated with the user; and selecting a second aggregated content data structure from the second plurality of aggregated content data structures based on the adjusted score; and mixing the second aggregated content data structure into the content stream associated with the user.

3. The method of claim 1, further comprising:

adjusting a score of at least one of a second plurality of aggregated content data structures based on selecting the first aggregated content data structure and based on a plurality of predetermined type target percentages for the plurality of category types, the plurality of predetermined type target percentages comprising the predetermined type target percentage for the category type associated with the first aggregated content data structure;

selecting a second aggregated content data structure from the second plurality of aggregated content data structures based on the adjusted score; and mixing the second aggregated content data structure into the content stream associated with the user.

4. The method of claim 3, further comprising:

generating a plurality of type selection percentages for the plurality of category types based on prior selections of respective aggregated data structures for mixing within the content stream of the user; and updating the plurality of type selection percentages based on and in response to selecting the first aggregated content data structure.

5. The method of claim 4, wherein the adjusting is based on a difference between the plurality of predetermined type target percentages and the updated plurality of type selection percentages.

6. The method of claim 4, wherein the adjusting comprises:

increasing the score of the at least one of the second plurality of aggregated content data structures when an updated type selection percentage associated with the at least one of the second plurality of aggregated content data structures is lower than a predetermined type target percentage associated with the at least one of the second plurality of aggregated content data structures; and decreasing the score of the at least one of the second plurality of aggregated content data structures when the updated type selection percentage associated with the at least one of the second plurality of aggregated content data structures is higher than the predetermined type target percentage associated with the at least one of the second plurality of aggregated content data structures.

7. The method of claim 1, further comprising:

normalizing the respective score of each of the first plurality of aggregated content data structures to be between a first predetermined value and a second predetermined value.

8. The method of claim 1, further comprising:

determining, for the user, a plurality of type target percentages for the plurality of category types, including the predetermined type target percentage for the category type associated with the first aggregated content data structure, based on prior interactions of the user with content items provided in a social network.

9. The method of claim 1, wherein, for each aggregated content data structure of the first plurality of aggregated content data structures, the respective score of the aggregated content data structure is determined based on respective scores of a plurality of the content items listed in the aggregated data structure and an affinity of the user to one or more attributes associated with the content items of the aggregated content data structure.

10. A computing system for creating an aggregate content list, comprising:

one or more processors; and a non-transitory machine-readable medium comprising instructions stored therein, which when executed by the one or more processors, cause the one or more processors to perform operations comprising:

receiving, from one or more servers different than the computing system, a first plurality of aggregated content data structures, wherein each aggregated content data structure comprises a listing of content items and is associated with a respective score and a respective category type of a plurality of category types, each of the content items being associated with the category type associated with the aggregated content data structure;

selecting a first aggregated content data structure from among the first plurality of aggregated content data structures based on respective scores for the first plurality of aggregated content data structures and a predetermined type target percentage for the category type of the first aggregated content data structure; and mixing the first aggregated content data structure into a content stream associated with a user; and providing the content stream, including the first aggregated content data structure, for display to the user at a computing device remote from the one or more servers and the computing system, wherein the servers may tag one or more attributes to the content items, and wherein the predetermined type target percentage is set such that aggregated content data structures less associated with attributes may have a higher predetermined type target percentage than aggregated content data structures more associated with attributes.

11. The computing system of claim 10, wherein the operations further comprise:

receiving an additional aggregated content data structure from a source of the selected first aggregated content data structure;

creating a second plurality of aggregated content data structures based on removing the selected first aggregated content data structure from the first plurality of aggregated content data structures and adding the received additional aggregated content data structure;

adjusting a score associated with at least one of the second plurality of aggregated content data structures based on the selected first aggregated content data structure and a plurality of predetermined type target percentages associated with the user;

selecting a second aggregated content data structure from the second plurality of aggregated content data structures based on the adjusted score; and mixing the second aggregated content data structure into the content stream associated with the user.

12. The computing system of claim 10, wherein the operations further comprise:

determining, for the user, a plurality of type target percentages for the plurality of category types, including the predetermined type target percentage for the category type associated with the first aggregated content data structure, based on prior interactions of the user with content items in a social network;

determining a plurality of type selection percentages for a plurality of category types based on prior selections of respective aggregated data structures for mixing within the content stream of the user;

adjusting a score associated with at least one of a second plurality of aggregated content data structures based on a difference between the determined plurality of type target percentages and the determined plurality of type selection percentages; and selecting a second aggregated content data structure from the second plurality of aggregated content based on the adjusted score; and mixing the second aggregated content data structure into the content stream associated with the user.

13. The computing system of claim 12, wherein the adjusting comprises:

updating a type selection percentage of the plurality of type selection percentages based on selecting the second aggregated content data structure;

increasing the score of the at least one of the second plurality of aggregated content data structures when the updated type selection percentage associated with the at least one of the second plurality of aggregated content data structures is lower than the predetermined type target percentage associated with the at least one of the second plurality of aggregated content data structures; and decreasing the score of the at least one of the second plurality of aggregated content data structures when the updated type selection percentage associated with the at least one of the second plurality of aggregated content data structures is higher than the predetermined type target percentage associated with the at least one of the second plurality of aggregated content data structures.

14. The computing system of claim 10, wherein, for each aggregated content data structure of the first plurality of aggregated content data structures, the respective score of the aggregated content data structure is determined based on respective scores of a plurality of the content items listed in the aggregated data structure and an affinity of the user to one or more attributes associated with the content items of the aggregated content data structure.

15. The computing system of claim 10, further comprising:

normalizing the score of each of the first plurality of aggregated content data structures to be between a first predetermined value and a second predetermined value.

16. A non-transitory machine-readable medium comprising instructions stored therein, which when executed by a machine, cause the machine to perform operations comprising:

receiving, from one or more servers different than the machine, a first plurality of aggregated content data structures, wherein each aggregated content data structure comprising a listing of content items and is associated with a respective score and a respective category type of a plurality of category types, each of the content items being associated with a category type associated with the aggregated content data structure;

normalizing the score of each of the first plurality of data structures to be between a first predetermined value and a second predetermined value;

selecting a first aggregated content data structure from among the first plurality of aggregated content data structures based on respective normalized scores for the first plurality of aggregated content data structures and a predetermined type target percentage for the category type of the first aggregated content data structure;

mixing the first aggregated content data structure into a content stream associated with a user; and providing the content stream, including the first aggregated content data structure, for display to the user at a computing device remote from the one or more servers and the machine, wherein the servers may tag one or more attributes to the content items, and wherein the predetermined type target percentage is set such that aggregated content data structures less associated with attributes may have a higher predetermined type target percentage than aggregated content data structures more associated with attributes.

17. The non-transitory machine-readable medium of claim 16, wherein the operations further comprise:

receiving an additional aggregated content data structure from a source of the selected first aggregated content data structure;

normalizing the score of the additional aggregated data structure such that the normalized score of the additional aggregated data structure is between the first predetermined value and the second predetermined value;

generating a second plurality of aggregated content data structures based on removing the selected first aggregated content data structure from the first plurality of aggregated content data structures and adding the received additional aggregated content data structure;

adjusting a normalized score associated with at least one of the second plurality of aggregated content data structures based on the selected first aggregated content data structure and a plurality of predetermined type target percentages associated with the user; and selecting a second aggregated content data structure from the second plurality of aggregated content data structures based on the adjusted score; and mixing the second aggregated content data structure into the content stream associated with the user.

18. The non-transitory machine-readable medium of claim 16, the operations further comprising:
determining a plurality of type selection percentages for a plurality of category types based on prior selections of respective aggregated data structures for mixing within the content stream of the user;
updating the type selection percentages based on the selected first aggregated content data structure.

19. The non-transitory machine-readable medium of claim 18, wherein the operations further comprise:
determining, for the user, a plurality of type target percentages for the plurality of category types, including the predetermined type target percentage for the category type associated with the first aggregated content data structure, based on prior interactions of the user with content items in a social network;
adjusting a normalized score associated with at least one of a second plurality of aggregated content data structures based on a difference between the determined plurality of type target percentages and the determined plurality of type selection percentages; and
selecting a second aggregated content data structure from the second plurality of aggregated content based on the adjusted score; and
mixing the second aggregated content data structure into the content stream associated with the user.

20. The non-transitory machine-readable medium of claim 19, wherein, for each aggregated content data structure of the first plurality of aggregated content data structures, the respective score of the aggregated content data structure is determined based on respective scores of a plurality of the content items listed in the aggregated data structure and an affinity of the user to one or more attributes associated with the content items of the aggregated content data structure.

* * * * *